United States Patent
Ota et al.

(10) Patent No.: US 12,235,128 B2
(45) Date of Patent: Feb. 25, 2025

(54) DATA REVISION DEVICE, DATA REVISION METHOD, DATA REVISION PROGRAM, AND VEHICLE

(71) Applicant: TOYOTA JIDOSHA KABUSHIKI KAISHA, Toyota (JP)

(72) Inventors: Takashi Ota, Tokyo-to (JP); Daisuke Nakata, Kawasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 439 days.

(21) Appl. No.: 17/705,934

(22) Filed: Mar. 28, 2022

(65) Prior Publication Data

US 2022/0316916 A1 Oct. 6, 2022

(30) Foreign Application Priority Data

Mar. 30, 2021 (JP) .................. 2021-058200

(51) Int. Cl.
*G01C 21/00* (2006.01)

(52) U.S. Cl.
CPC ..... *G01C 21/3859* (2020.08); *G01C 21/3819* (2020.08)

(58) Field of Classification Search
CPC ............ G01C 21/3859; G01C 21/3819; G05D 1/0251; G05D 1/0221; G05D 1/0223; G05D 1/0257; G05D 1/0276
See application file for complete search history.

(56) References Cited

U.S. PATENT DOCUMENTS

| 2020/0166364 A1* | 5/2020 | Fujita | G01C 21/3881 |
| 2020/0284590 A1* | 9/2020 | Chen | G01C 21/3841 |
| 2022/0163347 A1* | 5/2022 | Anastassov | G01C 21/3815 |
| 2022/0316916 A1* | 10/2022 | Ota | G01C 21/3819 |
| 2023/0152120 A1* | 5/2023 | Ikeda | G01C 21/3815 |
| | | | 701/450 |

FOREIGN PATENT DOCUMENTS

| JP | 2002279437 A | * | 9/2002 |
| JP | 2007-121311 A | | 5/2007 |
| JP | 2019-179217 A | | 10/2019 |

* cited by examiner

*Primary Examiner* — Daniel M. Robert
(74) *Attorney, Agent, or Firm* — Sughrue Mion, PLLC

(57) ABSTRACT

A data correction device includes a data acquiring part for acquiring map data including point sequence data showing a position of a first dividing line in a first section and point sequence data showing a position of a second dividing line corresponding to the first dividing line in a second section adjoining the first section; a position revising part for revising point data showing a position near a boundary of at least one of the first dividing line and the second dividing line so that the first dividing line and the second dividing line expressed by the point sequence data are smoothly connected at the boundary; and a position data output part for outputting point sequence data including point data showing revised positions of the dividing lines near the boundary.

8 Claims, 8 Drawing Sheets

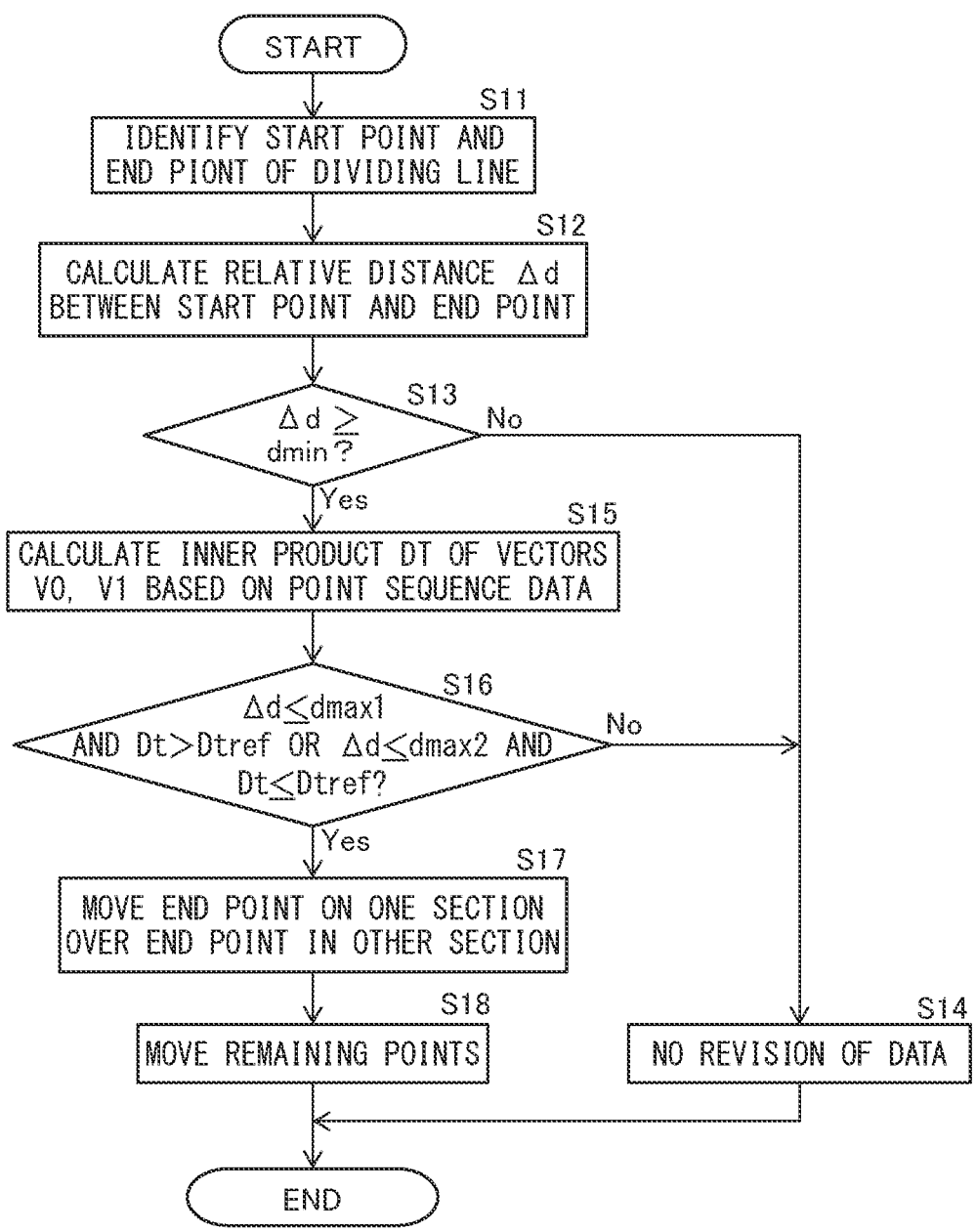

DATA REVISION DEVICE, DATA REVISION METHOD, DATA REVISION PROGRAM, AND VEHICLE

FIELD

The present disclosure relates to a data revision device, data revision method, data revision program, and vehicle having a data revision device.

BACKGROUND

In the past, it has been considered to prepare map data divided into a large number of sections and to revise the map data so that no deviation arises in the positions of corresponding roads and the like at boundaries of adjoining sections of the map data (JP 2002-279437 A, JP 2019-179217 A, and JP 2007-121311 A).

For example, in JP 2002-279437 A, if there are no matching nodes at positions on the boundaries of adjoining sections, it is proposed to revise the map data so that the positions of nodes on boundaries showing the same road become equal.

SUMMARY

In this regard, it has been considered to show a vehicle and dividing lines in the surroundings of the vehicle on a display inside the vehicle to enable a driver to obtain a grasp of the running conditions of the vehicle on the display. In this case, it has been thought to use point sequence coordinate data of the dividing lines included in a high precision map so as to obtain a grasp of the shapes of dividing lines in the surroundings of the vehicle.

A high precision map is generally prepared divided into sections of certain ranges (for example, several hundred meters square). Further, at the boundaries of adjoining sections, sometimes the positions shown by the point data at the end parts of the point sequence data near the boundaries showing the positions of the same dividing lines do not match, but deviate in the directions of extension of the dividing lines or directions perpendicular to the directions of extension of the dividing lines.

If in this way the positions shown by the point data near boundaries deviate in the directions of extension of the dividing lines, despite the dividing lines being connected on the actual road, on the display, the dividing lines will be displayed as if broken. Further, if positions shown by point data near boundaries deviate in directions perpendicular to the directions of extension of the dividing lines, despite the dividing lines continuously extending on the actual road, on the display, the dividing lines will be displayed as if deviating in the lateral direction near the boundaries of sections. If in this way discontinuous points appear on dividing lines on the display, feeling of quality in relation to the display of dividing lines on the display will be dropped.

In consideration of the above problems, an object of the present disclosure is to enable a dividing line to be smoothly shown on a display even if deviation occurs in the positions shown by point sequence data showing positions of the same dividing line at a boundary between sections of map data.

The present invention has as its gist the following.

(1) A data revision device for revising data showing a position of a dividing line included in map data stored divided into sections, the data correction device comprising:

a data acquiring part for acquiring map data including point sequence data showing a position of a first dividing line in a first section and point sequence data showing a position of a second dividing line corresponding to the first dividing line in a second section adjoining the first section;

a position revising part for revising point data showing a position near a boundary of at least one of the first dividing line and the second dividing line so that when a relative distance between a position shown by point data of an end point at a boundary side of the first section and the second section in the point sequence data showing the position of the first dividing line and a position shown by point data of an end point at the boundary side in the point sequence data showing the position of the second dividing line is greater than or equal to a predetermined minimum reference distance, the first dividing line and the second dividing line expressed by the point sequence data are smoothly connected at the boundary; and a position data output part for outputting point sequence data showing positions of the first dividing line and the second dividing line other than near the boundary acquired by the data acquiring part and point data showing positions of the first dividing line and the second dividing line near the boundary revised by the position revising part, as data showing positions of a dividing line including the first dividing line and the second dividing line.

(2) The data revision device according to above (1), wherein the position revising part does not revise the point data showing the positions of the dividing line when the relative distance is larger than a maximum reference distance of greater than or equal to the minimum reference distance.

(3) The data revision device according to (2), wherein the maximum reference distance includes a first distance in a direction of extension of the first dividing line or the second dividing line shown by point sequence data near the boundary toward the boundary and a second distance in a direction perpendicular to that direction of extension, the first distance being longer than the second distance.

(4) The data revision device according to any one of above (1) to (3), wherein the position revising part makes a position shown by point data positioned at an end part at the boundary side in the point sequence data showing a position of the second dividing line move so as to be superposed over a position shown by point data positioned at an end part at the boundary side in the point sequence data showing a position of the first dividing line, and revise the remaining point data showing positions of the second dividing line near the boundary so that the dividing line shown by these point data become smooth.

(5) A vehicle having a data revision device according to any one of above (1) to (4), the vehicle comprising:

a display arranged so that an occupant can view it; and a display part displaying an image including a dividing line icon on the display, wherein the display part displays the dividing line icon based on data output by the position data output part.

(6) The vehicle according to above (5), further comprising an automated driving control part for controlling automated driving of the vehicle by using the map data, wherein the automated driving control part controls automated driving of the vehicle by using data showing positions of the dividing line not revised by the position revising part.

(7) A data revision method for revising data showing a position of a dividing line included in map data stored divided into sections, the data revision method comprising:

acquiring map data including point sequence data showing a position of a first dividing line in a first section and point sequence data showing a position of a second dividing line corresponding to the first dividing line in a second section adjoining the first section;

revising point data showing a position near a boundary of at least one of the first dividing line and the second dividing line so that when a relative distance between a position shown by point data of an end point at a boundary side of the first section and the second section in the point sequence data showing the position of the first dividing line and a position shown by point data of an end point at the boundary side in the point sequence data showing the position of the second dividing line is greater than or equal to a predetermined minimum reference distance, the first dividing line and the second dividing line expressed by the point sequence data are smoothly connected at the boundary; and outputting point sequence data showing positions of the first dividing line and the second dividing line other than near the boundary and point data showing the revised positions of the first dividing line and the second dividing line near the boundary, as data showing positions of a dividing line including the first dividing line and the second dividing line.

(8) A data revision program for revising data showing a position of a dividing line included in map data stored divided into sections, the data revision program making a computer:

acquire map data including point sequence data showing a position of a first dividing line in a first section and point sequence data showing a position of a second dividing line corresponding to the first dividing line in a second section adjoining the first section;

revise point data showing a position near a boundary of at least one of the first dividing line and the second dividing line so that when a relative distance between a position shown by point data of an end point at a boundary side of the first section and the second section in the point sequence data showing the position of the first dividing line and a position shown by point data of an end point at the boundary side in the point sequence data showing the position of the second dividing line is greater than or equal to a predetermined minimum reference distance, the first dividing line and the second dividing line expressed by the point sequence data are smoothly connected at the boundary; and output point sequence data showing positions of the first dividing line and the second dividing line other than near the boundary and point data showing the revised positions of the first dividing line and the second dividing line near the boundary, as data showing positions of a dividing line including the first dividing line and the second dividing line.

BRIEF DESCRIPTION OF DRAWINGS

FIG. 10 is a flow chart showing the flow of position revision processing performed by a position revising part.

DESCRIPTION OF EMBODIMENTS

Figure 1:
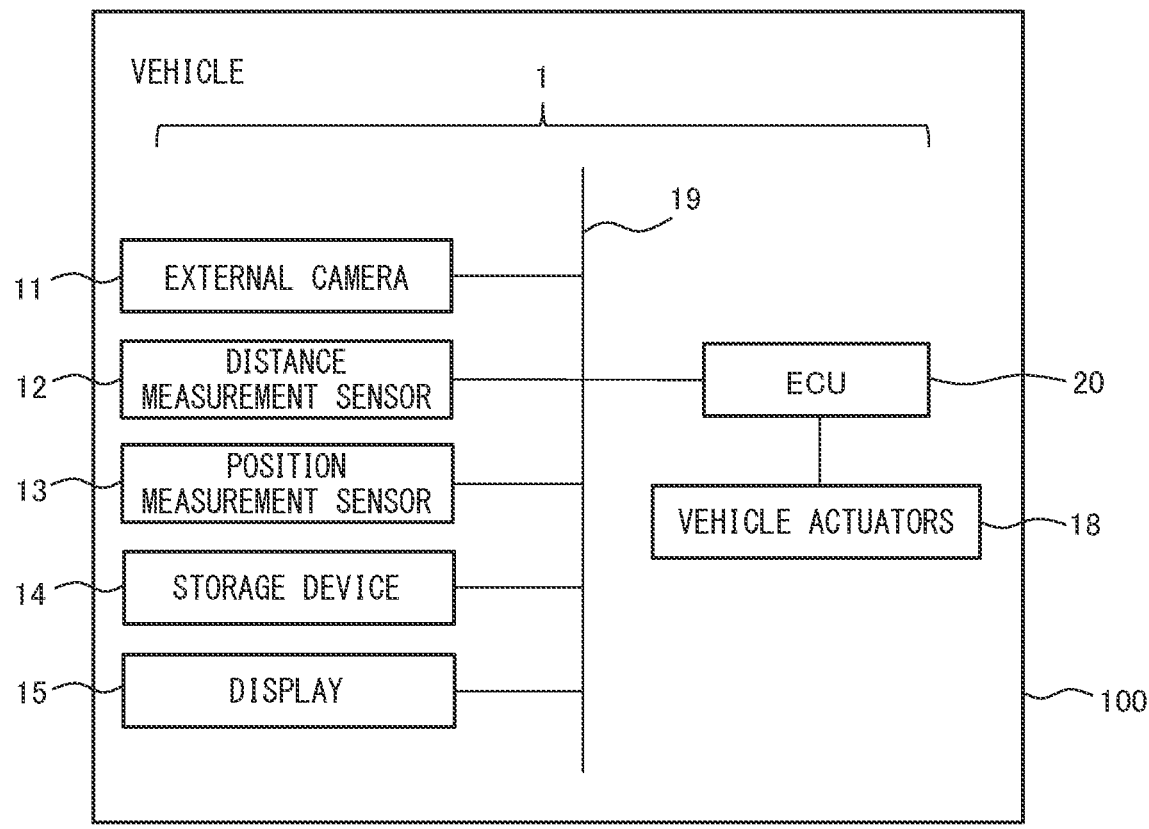
FIG. 1 is a view of the configuration schematically showing a vehicle in which a vehicle control system according to one embodiment is mounted.

Below, embodiments will be explained in detail referring to the drawings. Note that, in the following explanation, similar components are assigned the same reference notations.

Configuration of Vehicle

FIG. 1 is a view of the configuration schematically showing a vehicle 100 in which a vehicle control system 1 according to one embodiment is mounted. The vehicle control system 1 is mounted in the vehicle 100 and performs various controls of the vehicle 100. In the present embodiment, the vehicle control system 1 performs an automated driving control, and a display control of a display of the vehicle 100. In the present embodiment, the vehicle control system 1 has an external camera 11, distance measurement sensor 12, position measurement sensor 13, storage device 14, display 15, vehicle actuators 18, and an electronic control unit (below, "ECU") 20.

However, the vehicle control system 1 need not necessarily have all of them. For example, the vehicle control system 1 need not have the distance measurement sensor 12 if having the external camera 11.

The external camera 11, distance measurement sensor 12, position measurement sensor 13, storage device 14, display 15, vehicle actuators 18 and ECU 21 are connected to be able to communicate through an internal network 19. The internal network 19 is a network based on the CAN (Controller Area Network) or other standard. Further, the ECU 20 is connected through signal wires to the vehicle actuators 18.

The external camera 11 is a device for capturing an image of the surroundings of the vehicle. The external camera 11 has a 2D detector (CCD, C-MOS, etc.) configured by an array of photoelectric conversion devices having sensitivity to visible light, and an image-forming optical system forming, on the 2D detector, an image of a region to be captured. In the present embodiment, the external camera 11 is attached for example inside the vehicle 100 so as to face forward of the vehicle 100. The external camera 11 captures the region in front of the vehicle 100 every predetermined capturing period (for example 1/30 second to 1/10 second), and generates an image showing that front region. The external camera 11 outputs the generated image through the internal network 19 to the ECU 20, every time generating an image. Note that, the external camera 11 may be a single lens camera or may be a stereo camera. If a stereo camera is used as the external camera 11, the external camera 11 also functions as a distance measurement sensor 12. The vehicle 100 may be provided with a plurality of external cameras differing in capture direction or focal distance.

The distance measurement sensor 12 is a sensor measuring the distance to an object present in the surroundings of the vehicle 100. In the present embodiment, the distance measurement sensor 12 can also measure an azimuth of the object present in the surroundings of the vehicle 100. The distance measurement sensor 12 is, for example, a milliwave radar or other radar, a LiDAR, or sonar. In the present embodiment, the distance measurement sensor 12 measures the distance to an object present in front of the vehicle. The distance measurement sensor 12 outputs the measurement result of the distance to an object in the surroundings, every predetermined period, through the internal network 19 to the ECU 20.

The position measurement sensor 13 is a sensor measuring a self-position of the vehicle 100. The position measurement sensor 13 is, for example, a GNSS (Global Navigation Satellite System) receiver. The GNSS receiver receives signals with time information from a plurality of position measurement satellites, and measures the self-position of the vehicle 100 based on the received signals. The position measurement sensor 13 outputs the self-position information of the vehicle 100, every predetermined period, through the internal network 19 to the ECU 20.

The storage device 14, for example, has a hard disk drive or a nonvolatile semiconductor memory. The storage device 14 stores map data. The map data is stored divided into a large number of sections (for example, sections of several hundred meters square). In the present embodiment, the map data showing each section includes information showing markings of roads in the section (for example, lane lines or stop lines) and information showing lane center lines. In particular, in the map data of the present embodiment, the dividing lines and lane center lines are represented by point sequence data showing coordinates of constant intervals. The storage device 14 reads out map data in accordance with a readout request of map data from the ECU 20, and transmits the map data through the internal network 19 to the ECU.

The display 15 is a display device for displaying information relating to the vehicle 100 and operation of the vehicle 100, and is arranged so that occupants of the vehicle 100 can view it. In particular, in the present embodiment, the display 15 functions as a display device showing dividing line icons corresponding to dividing lines around the vehicle 100 and vehicle icons corresponding to other vehicles in the surroundings of the vehicle 100. The display 15 is, for example, a liquid crystal display or organic EL display or other display showing an image on a screen. Alternatively, the display 15 may be a heads-up display projecting an image on a transparent plate provided in front of the driver such as the window glass at the front of the vehicle 100. Whatever the case, the display 15 may be any type of display so long as able to display an image. The display 15 is connected to the ECU 20 through the internal network 19. The display 15 receives a display signal from the ECU 20, and displays an image corresponding to the received display signal.

The vehicle actuators 18 are actuators used for controlling the operation of the vehicle 100. Specifically, the vehicle actuators 18 include, for example, a drive actuator for controlling an internal combustion engine or electric motor for driving the vehicle 100, and a brake actuator for controlling brakes braking the vehicle 100. Further, the vehicle actuators 18 includes a steering actuator for controlling steering of the vehicle 100. The vehicle actuators 18 control acceleration, braking and steering of the vehicle 100, in accordance with control signals sent from the ECU 20 through signal wires.

Figure 2:
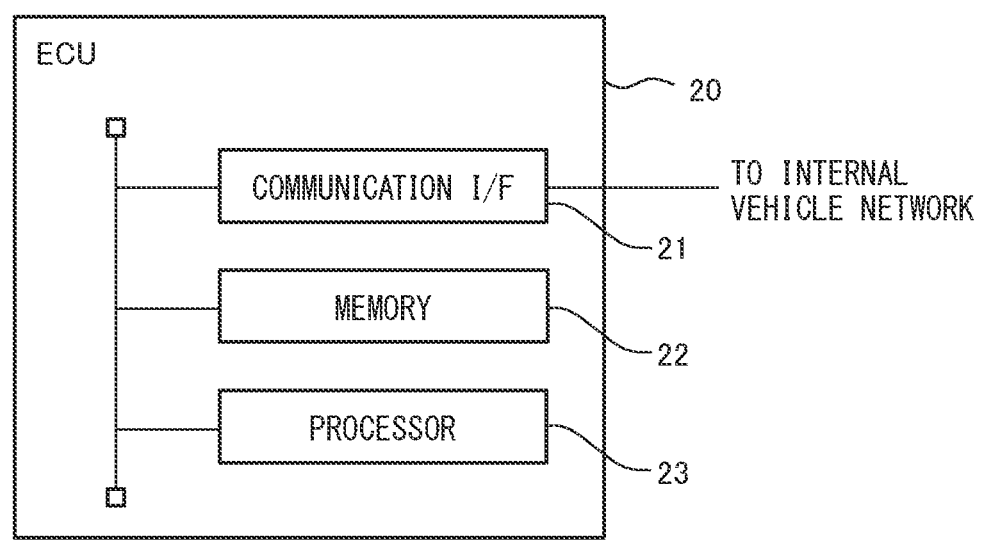
FIG. 2 is a view of a hardware configuration of an ECU according to one embodiment.

FIG. 2 is a view of the hardware configuration of the ECU 20 according to one embodiment. The ECU 20 has a communication interface 21, memory 22, and processor 23. Note that, the communication interface 21, memory 22, and processor 23 may be separate circuits, or may be configured as a single integrated circuit. Further, in the example shown in FIGS. 1 and 2, the vehicle control system 1 has a single ECU 20, but may also have a plurality of ECUs for individual functions.

The communication interface 21 has a communication interface circuit and a device interface circuit. The communication interface circuit is a circuit for connecting the ECU 20 to the internal network 19. The device interface circuit is a circuit for outputting control signals to the vehicle actuators 18.

The communication interface 21 sends a received image to the processor 23, each time receiving an image from the external camera 11. In addition, the communication interface 21 transmits measurement results of the distance to an object in the surroundings of the vehicle to the processor 23, each time receiving measurement results from the distance measurement sensor 12. Furthermore, the communication interface 21 transmits the measurement results of the self-position to the processor 23, each time receiving the measurement results from the position measurement sensor 13. Further, the communication interface 21 transmits a high precision map read from the storage device 14 to the processor 23. In addition, the communication interface 21 transmits a received display signal to the display 15, every time receiving a display signal from the ECU 20. Furthermore, the communication interface 21 transmits received control signals to the vehicle actuators 18, every time receiving such control signals to the vehicle actuators 18 from the ECU 20.

The memory 22 is a storage device for storing data. The memory 22 includes, for example, a volatile semiconductor memory and a nonvolatile semiconductor memory. The memory 22 stores a program for the automated driving control processing, display control processing, and data revision processing (details thereof explained later) performed by the processor 23 of the ECU 20. Further, the memory 22 stores images captured by the external camera 11, measurement results of the distance to an object in the surroundings of the vehicle, measurement results of the self-position, and various types of data used in the automated driving control processing, display control processing, and data revision processing, and the like.

The processor 23 has one or more CPUs (central processing units) and their peripheral circuits. The processor 23 may further have a logic unit or arithmetic unit or other such processing circuit. The processor 23 performs various processing based on a computer program stored in the memory 22. Therefore, the processors 23 outputs control signals of the vehicle actuators 18 to control the vehicle actuators 18. Further, the processor 23 outputs display signals of the display 15 to control images to be displayed at the display 15. In particular, in the present embodiment, the processor 23 functions as a revision device for revising data showing positions of dividing lines contained in map data, a display device for displaying images on the display 15, and an automated driving device for automated driving control of the vehicle 100.

Figure 3:
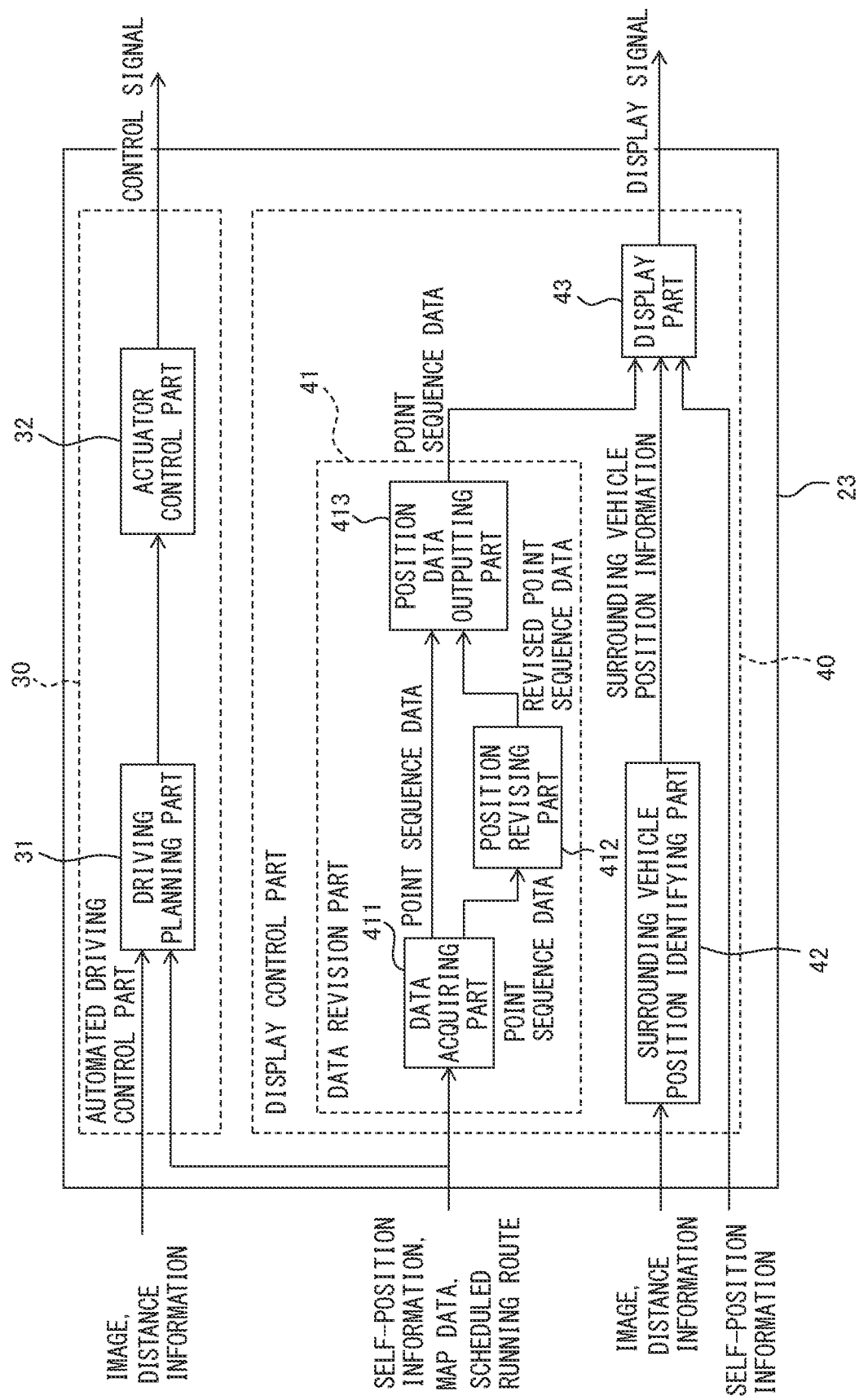
FIG. 3 is a functional block diagram of a processor of the ECU.

FIG. 3 is a functional block diagram of the processor 23 of the ECU 20. As shown in FIG. 3, the processor 33, roughly divided, has an automated driving control part 30 for automated driving control of the vehicle 100 by using map data, self-position information, or the like and a display control part 40 for control of display of an image on the display 15. The automated driving control part 30 has a driving planning part 31 and an actuator control part 32. Further, the display control part 40 has a data revision part 41, a surrounding vehicle position identifying part 42, and a display part 43. Furthermore, the data revision part 41 has a data acquiring part 411, a position revising part 412, and a position data output part 413. These functional blocks of the processor 23 are, for example, functional modules performed by a computer program running on the processor 23. Alternatively, these functional blocks of the processor 23 may be dedicated processing circuits provided at the processor.

Automated Driving Control

The automated driving control processing performed by the automated driving control part 30 will be briefly explained. The automated driving control part 30, as explained above, has the driving planning part 31 and the actuator control part 32.

The driving planning part 31 receives as input the images generated by the external camera 11, distance information up to objects in the surroundings measured by the distance measurement sensor 12, information showing the self-position measured by the position measurement sensor 13, map data stored in the storage device 14, etc. In particular, in the present embodiment, map data not revised by the later explained data revision part 41 is input. Therefore, the automated driving control part 30 uses data showing the positions of the dividing lines not revised by the later explained position revising part 412 to perform automated driving control of the vehicle 100. That is, the automated driving control part 30 uses unprocessed highly reliable data for automated driving control of the vehicle 100. The driving planning part 31 outputs the demanded acceleration/deceleration degree and the demanded steering angle, based on the input information. In addition, the driving planning part 31 receives as input from a navigation system (not shown) or the like the scheduled running route to the destination set by the driver.

More specifically, the driving planning part 31 sets a scheduled path over which the vehicle 100 runs (below, referred to as the "scheduled running path") in a predetermined section from the current position of the vehicle 100 to a predetermined distance forward (for example, 500 m to 1 km), while the vehicle 100 is being controlled for automated driving. Further, the driving planning part 31 calculates the demanded acceleration/deceleration degree and the demanded steering angle (demanded control value) for the vehicle 100 to run along the scheduled running path. The scheduled running path, for example, is represented as a set of positions of the vehicle 100 at different times when the vehicle 100 is running through a predetermined section.

The driving planning part 31 sets the scheduled running path so as to follow the scheduled running route to the destination. For example, the driving planning part 31 sets the scheduled running path so that the vehicle 100 runs along the lane on which it is currently running, if there are no points turning right and points turning left on the scheduled running route in the closest predetermined section. On the other hand, if there are points turning right or points turning left on the scheduled running route in the closest predetermined section, the driving planning part 31 sets the scheduled running path so that the vehicle can turn right or turn left at the points. Note that, the driving planning part 31, for example, compares objects shown in the images of the surroundings of the vehicle 100 obtained by the camera provided at the vehicle 100 and objects of the surroundings of the vehicle 100 shown in the map data to identify the lane in which the vehicle 100 is currently running and the current position of the vehicle 100.

Furthermore, the driving planning part 31 sets the scheduled running path so that the vehicle 100 does not collide with objects present in the surroundings (for example, other vehicles). For this reason, the driving planning part 31 acquires a time series of images in a closest predetermined time period from the external camera 11 mounted on the vehicle 100. Further, the driving planning part 31 inputs the acquired series of images into a discriminator pretrained so as to detect objects in the surroundings of the vehicle 100, so as to detect one or more objects present in the surroundings of the vehicle 100 from the images. Alternatively, the driving planning part 31 acquires a time series of distance measurement signals in a closest predetermined time period from the distance measurement sensor 12. Further, the driving planning part 31 inputs the acquired series of distance measurement signals into a discriminator pretrained so as to detect objects in the surroundings of the vehicle 100, so as to detect one or more objects present in the surroundings of the vehicle 100 from the distance measurement signals.

The driving planning part 31 uses as such a discriminator, for example, a so-called deep neural network (DNN) having a convolutional neural network (CNN) type architecture. Such a discriminator uses a large number of images showing the objects to be detected or distance measurement signals for pretraining in accordance with the training technique such as error backscattering.

The driving planning part 31 performs predetermined tracking processing on individual objects detected from the images or distance measurement signals to track the objects and determine the paths of the objects in the closest predetermined time period, and applies predetermined processing for prediction of the sought path to estimate for each object the predicted path through which the object is envisioned to pass. Further, the driving planning part 31 sets the scheduled running path of the vehicle 100, based on the predicted paths of the objects being tracked so that, for each object, the predicted value of the distance between each of the objects being tracked and the vehicle 100 up to a predetermined time in the future is greater than or equal to a predetermined distance.

If setting the scheduled running path, the driving planning part 31 determines the demanded acceleration/deceleration degree and the demanded steering angle so that the vehicle 100 runs along the scheduled running path. For example, the driving planning part 31 calculates the demanded acceleration/deceleration degree and the demanded steering angle of the vehicle 100 for each period in accordance with the scheduled running path, the current position of the vehicle 100, and the current speed of the vehicle 100 measured by a vehicle speed sensor (not shown). Each time calculating the demanded acceleration/deceleration degree and the demanded steering angle, the driving planning part 31 sends the calculated demanded acceleration/deceleration degree and demanded steering angle to the actuator control part 32.

The actuator control part 32 sends control signals to the vehicle actuators 18 so that the vehicle 100 accelerates or decelerates, and is steered in accordance with the demanded acceleration/deceleration degree and the demanded steering angle. The actuator control part 32 receives as input the demanded acceleration/deceleration degree and the demanded steering angle calculated by the driving planning part 31. Then, the actuator control part 32 outputs control signals to the vehicle actuators 18, based on the input demanded control values.

For example, if acceleration of the vehicle 100 is demanded, the actuator control part 32 sends a control signal to the drive actuator so that the vehicle 100 is accelerated in accordance with the demanded acceleration degree. Further, if deceleration of the vehicle 100 is demanded, the actuator control part 32 sends a control signal to the brake actuator so that the vehicle 100 is decelerated in accordance with the demanded deceleration degree. In addition, if steering of the vehicle 100 is demanded, the actuator control part 32 sends a control signal to the steering actuator so that the vehicle 100 is steered in accordance with the demanded steering angle.

Display Control

Next, the display control processing performed by the display control part 40 will be explained. The display control part 40, as explained above, performs control for displaying an image on the display 15.

Figure 4:
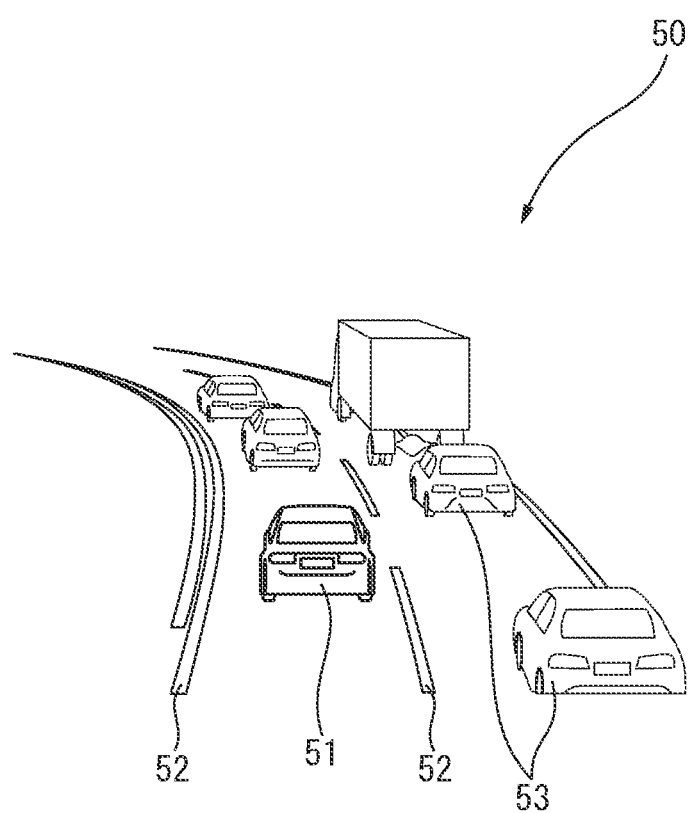
FIG. 4 is a view showing one example of part of a display screen of a display.

FIG. 4 is a view showing one example of part of a display screen of the display 15. The display 15 is provided with a road condition display region 50 such as shown in FIG. 2. The display control part 40 makes the road condition display region 50 display road conditions schematically showing the conditions of the road mainly in front of the vehicle 100, in particular the road conditions viewing the area in front of the vehicle 100 from the top back of the vehicle 100. For example, the display control part 40 makes the display 15 display, as road conditions, an ego vehicle icon 51 corresponding to the vehicle (ego vehicle) 100, dividing line icons 52 corresponding to dividing lines on a road on which the vehicle 100 is running, and surrounding vehicle icons 53 corresponding to other vehicles in the surroundings of the vehicle 100. Note that, the display control part 40 may also make the display 15 display information other than the road (for example, speed of vehicle, temperature of outside of vehicle, current time, shift position, water temperature, remaining fuel, various warnings, energy consumption display, etc.) in region other than the road condition display region 50.

In the present embodiment, the ego vehicle icon 51 is displayed at the same position of the display 15 at all times. In particular, in the present embodiment, the ego vehicle icon 51 is displayed at the bottom center of the road condition display region 50 of the display 15. The ego vehicle icon 51 is displayed facing the same direction, in particular the front surface, at all times, and is displayed by a separate color or separate shape from the surrounding vehicle icons 53. The dividing line icons 52 are displayed at the road condition display region 50 so that the relative positions between the ego vehicle icon 51 and the dividing line icons 52 correspond to the relative positions of the vehicle 100 and the dividing lines on the road. Further, the surrounding vehicle icons 53 are displayed at the road condition display region 50 so that the relative positions of the ego vehicle icon 51 and the surrounding vehicle icons 53 correspond to the relative positions of the vehicle 100 and other vehicles on the road.

As shown in FIG. 3, the display control part 40 has a data revision part 41 for revising data showing positions of dividing lines, a surrounding vehicle position identifying part 42 for identifying positions of other vehicles running in the surroundings of the vehicle 100, and a display part 43 for making the display 15 show images including dividing line icons.

The data revision part 41 receives as input information showing the self-position measured by the position measurement sensor 13, map data stored in the storage device 14, and a scheduled running route until a destination set by the driver. The data revision part 41, as later explained, revises part of the point sequence data showing the positions of dividing lines included in map data stored in a state divided into a plurality of sections, then outputs the revised point sequence data to the display part 43. Alternatively, the data revision part 41, as later explained, outputs as is the point sequence data showing the positions of dividing lines included in map data stored divided into a plurality of sections to the display part 43.

The surrounding vehicle position identifying part 42 receives as input images generated by the external camera 11 and distance information until objects in the surroundings measured by the distance measurement sensor 12. The surrounding vehicle position identifying part 42, in the present embodiment, identifies relative positions of other vehicles running in the surroundings of the vehicle 100 with respect to the vehicle 100, based on the input information. Further, the surrounding vehicle position identifying part 42 outputs the relative position information of other vehicles with respect to the vehicle 100 to the display part 43.

Specifically, the surrounding vehicle position identifying part 42, for example, in the same way as the above-mentioned driving planning part 31, inputs a time series of images and/or time series of distance measurement signals to a pretrained discriminator to detect other vehicles present in the surroundings of the vehicle 100. As such a discriminator, for example, a CNN or the like are used.

The display part 43 receives as input the point sequence data showing the positions of dividing lines output from the data revision part 41, the relative position information of other vehicles output from the surrounding vehicle position identifying part 42, and the self-position information measured by the position measurement sensor 13.

The display part 43 outputs a display signal to the display 15 so as to show the ego vehicle icon 51 at the same position at all times. In addition, the display part 43 calculates the relative positions of the vehicle 100 and dividing lines, based on the self-position information and the point sequence data showing the positions of the dividing lines. Then, the display part 43 outputs display signals for displaying the dividing line icons 52 to the display 15 so that the relative positions between the ego vehicle icon 51 and the dividing line icons 52 correspond to the thus calculated relative positions of the vehicle 100 and dividing lines. In addition, the display part 43 outputs display signals for displaying the surrounding vehicle icons 53 to the display 15 so that the relative positions between the ego vehicle icon 51 and the surrounding vehicle icons 53 correspond to the relative positions identified by the surrounding vehicle position identifying part 42. Therefore, the display part 43 makes the dividing line icons 52 be displayed based on the point sequence data showing the positions of the dividing lines output from the data revision part 41, and makes the surrounding vehicle icons 53 be displayed based on the relative positions of surrounding vehicles identified by the surrounding vehicle position identifying part 42.

Breaks and Deviations of Dividing Line Icons

In this regard, as explained above, map data is stored in a state divided into a large number of sections of, for example, several hundred meters square. Further, as explained above, in the map data, the dividing lines are shown by point sequence data showing coordinates of constant intervals. Therefore, at a boundary of adjoining sections, for example, it becomes necessary to connect the point sequence data showing the position of a certain dividing line in one section and the point sequence data showing the position of the same dividing line in the other section. Further, map data is basically prepared so that, at such a boundary, the position (coordinates) shown by the point data of the end part at the boundary side in point sequence data showing the position of a certain dividing line in one section and the position (coordinates) shown by the point data of the end part at the boundary side in point sequence data showing the position of the same dividing line in the other section, match.

In this regard, however, in such prepared map data, sometimes the positions shown by the point data of the end parts at the boundary side in point sequence data showing the positions of the same dividing line at the boundary between sections, deviate from each other. This state is shown in FIG. 5.

Figure 5:
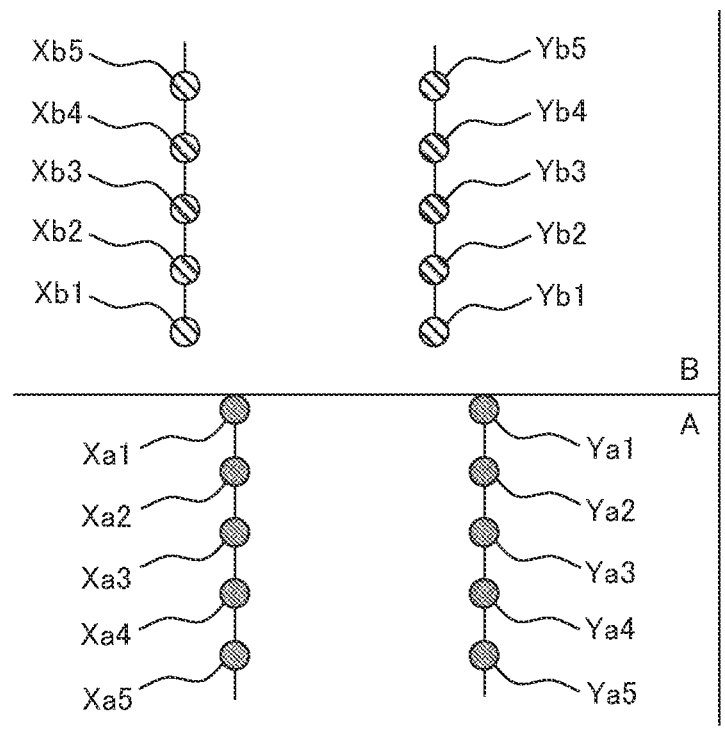
FIG. 5 is a schematic view showing positions shown by point sequence data showing positions of the same dividing lines in an adjoining section A (first section) and section B (second section).

FIG. 5 is a schematic view showing positions shown by point sequence data showing positions of the same dividing lines in an adjoining section A (first section) and section B (second section). In FIG. 5, for convenience, a separation line separating the map into the section A and the section B are shown, but actual map data does not include such a separation line. In the example shown in FIG. 5, the case is shown where a dividing line X and dividing line Y extend crossing the boundary of the section A and the section B. Note that, in this Description, the section in which the points over which the vehicle 100 currently runs is referred to as the "section A", and the section in which the points over which the vehicle 100 is scheduled to run after the section A is referred to as the "section B".

As shown in FIG. 5, the map data relating to the section A includes the point sequence data Xa1, Xa2, ... and Ya1, Ya2, ... of the dividing lines X and Y (first dividing lines) in the section A. In the same way, the map data relating to the section B includes the point sequence data Xb1, Xb2, ... and the point sequence data Yb1, Yb2, ... of the dividing lines X and Y (second dividing lines) in the section B.

Further, in the example shown in FIG. 5, the position shown by the point data Xa1 of the end part in the point sequence data Xa1, Xa2, ... at the boundary side showing the position of the dividing line X in the section A and the position shown by the point data Xb1 of the end part in point sequence data Xb1, Xb2, ... at the boundary side showing the position of the dividing line X in the section B do not match, but deviate. Similarly, the position shown by the point data Ya1 of the end part in point sequence data Ya1, Ya2, ... at the boundary side showing the position of the dividing line Y in the section A and the position shown by the point data Yb1 of the end part in point sequence data Yb1, Yb2, ... at the boundary side showing the position of the dividing line Y in the section B do not match, but deviate. In particular, in the example shown in FIG. 5, the positions shown by the point data of the end parts deviate in the directions perpendicular to the directions of extension of the dividing lines X and Y and in the directions of extension of the dividing lines X and Y.

Figure 6:
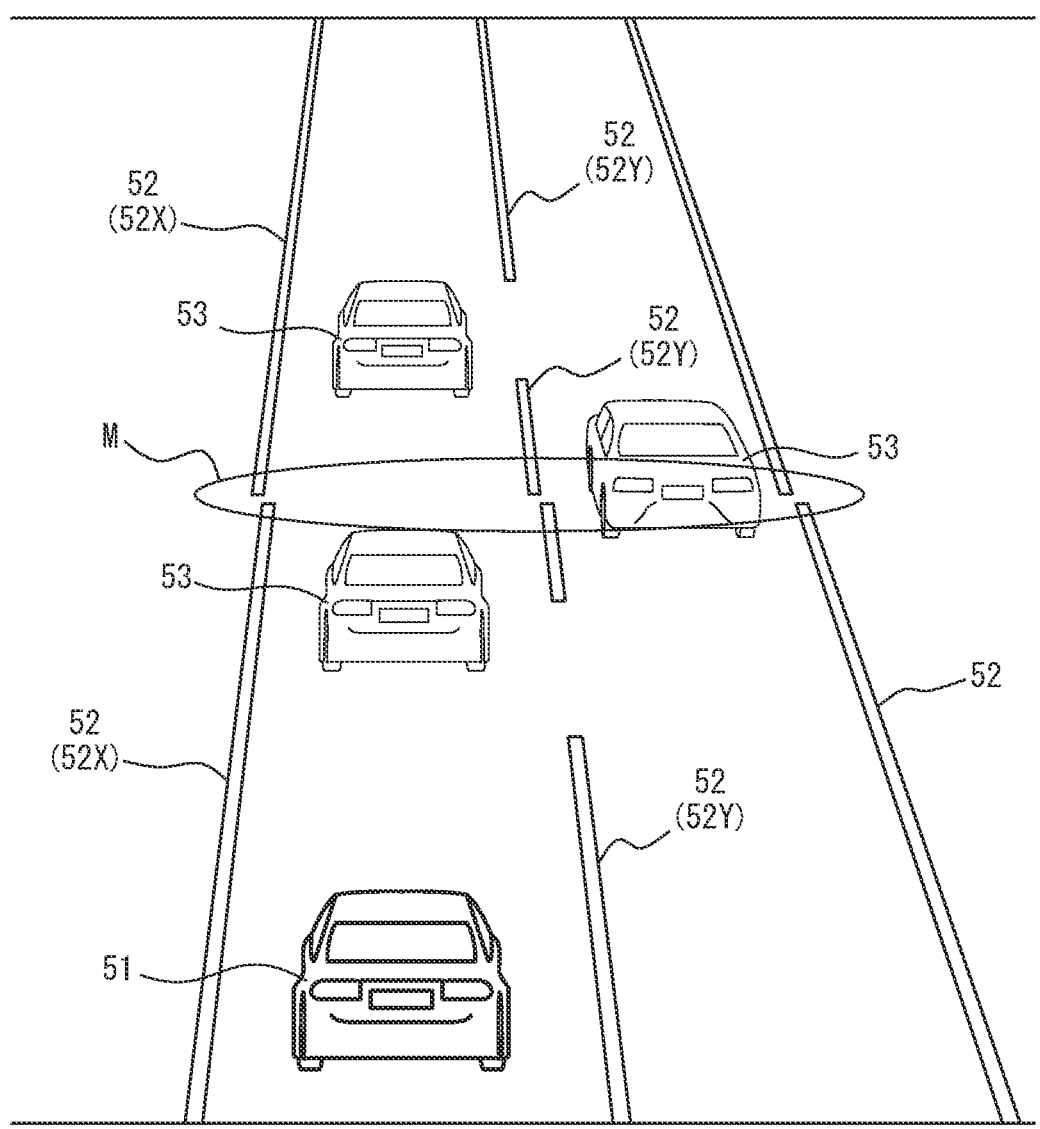
FIG. 6 is a view showing an example of dividing line icons shown by point sequence data showing positions of dividing lines such as shown in FIG. 5.

FIG. 6 is a view showing an example of dividing line icons shown by point sequence data showing positions of dividing lines X and Y such as shown in FIG. 5. In particular, the region M of FIG. 6 is a region corresponding to the vicinity of the boundary of the section A and the section B. Further, the dividing line icon 52X in the figure is displayed based on the point sequence data Xa1, Xa2, ... and Xb1, Xb2, ... showing the position of the dividing line X, while the dividing line icon 52Y is displayed based on the point sequence data Ya1, Ya2, ... and Yb1, Yb2, ... showing the position of the dividing line Y.

As will be understood from FIG. 6, the dividing line icons 52X and 52Y are unnaturally broken at the region M in the directions of extension of the dividing line icons 52X and 52Y. Further, the dividing line icons 52X and 52Y are unnaturally shifted in the region M in directions perpendicular to the directions of extension of the dividing line icons 52X and 52Y. If the positions shown by the point data of the end parts in this way deviate in the directions of extension of the dividing lines and directions perpendicular to the same, unnatural breaks and deviation occur in the dividing line icons 52, and thus the quality of the display of the dividing line icons is dropped.

Revision of Data of Dividing Lines

Therefore, if deviation occurs between the positions shown by the point data of the end parts of the point sequence data showing the positions of the same dividing lines at the boundary of adjoining sections, the data revision part 41 in the present embodiment revises part of the point sequence data showing the positions of the dividing lines, and outputs the revised point sequence data. Referring to FIGS. 3 and 7 to 9, the processing for revision of the point sequence data at the data revision part 41 will be explained.

The data revision part 41 has a data acquiring part 411 for acquiring map data including point sequence data showing positions of dividing lines, a position revising part 412 for revising point data showing the positions of the dividing lines in the vicinity of the boundary in the case where the dividing lines extend crossing the boundary of adjoining sections, and a position data output part 413 for outputting point sequence data showing the positions of the dividing lines combining the unrevised point sequence data showing the positions of the dividing lines and the revised point data.

The data acquiring part 411 receives as input information showing the self-position measured by the position measurement sensor 13, map data stored in the storage device 14, a scheduled running route until a destination set by the driver, etc. Further, the data acquiring part 411 acquires point sequence data showing the positions of dividing lines of a road on which the vehicle 100 is scheduled to run from the current position of the vehicle 100 to a predetermined distance forward (for example, 300 to 500 m), based on the information.

If the stretch from current position of the vehicle 100 to a predetermined distance forward falls in a single section, the data acquiring part 411 acquires point sequence data showing the positions of dividing lines of the road scheduled to be run on up to a predetermined distance forward, from only that one section of the map data. In that case, no deviation occurs in the point sequence data showing the positions of the dividing lines, therefore there is no need to revise the point sequence data. Therefore, the data acquiring part 411 outputs the acquired point sequence data not to the position revising part 412 for revising the point data, but to the position data output part 413.

On the other hand, if the stretch from current position of the vehicle 100 to a predetermined distance forward does not fall in a single section, the data acquiring part 411 acquires the point sequence data showing the positions of dividing lines of the road scheduled to be run on up to a predetermined distance forward, from the map data of the section which the vehicle 100 is currently positioned at (section A) and the adjoining section which the vehicle 100 is scheduled to next enter (section B). That is, the data acquiring part 411 acquires map data including the point sequence data Xa1, Xa2, . . . and Ya1, Ya2, . . . showing the positions of dividing lines (first dividing lines) in the section A (first section), and the point sequence data Xb1, Xb2, . . . and Yb1, Yb5, . . . showing the positions of dividing lines (second dividing lines) corresponding to the dividing lines (first dividing lines) of the section A at the section B (second section) adjoining the section A. In this case, as explained above, there is a possibility of deviation occurring in the point sequence data showing the positions of dividing lines at the boundary of the adjoining sections, therefore in some cases, it is necessary to revise the point sequence data. Therefore, the data acquiring part 411 outputs the acquired point sequence data to the position revising part 412 for revising the point data.

The position revising part 412 receives as input from the data acquiring part 411 the point sequence data of the dividing lines crossing the boundary of the section A and the section B. If such point sequence data is input, the position revising part 412 first calculates the relative distances between the positions shown by the point data Xa1 and Ya1 of the end parts at the boundary side in the point sequence data showing the positions of the dividing lines (first dividing lines) in the section A (first section) and the positions shown by the point data Xb1 and Yb1 of the end parts at the boundary side in the point sequence data showing the positions of the dividing lines (second dividing lines) in the section B. Further, when the calculated relative distances are within a predetermined reference range, the position revising part 412 revises part of the point data of these point sequence data. On the other hand, when the calculated relative distances are outside the predetermined reference range, the position revising part 412 does not revise the point sequence data.

Figure 7:
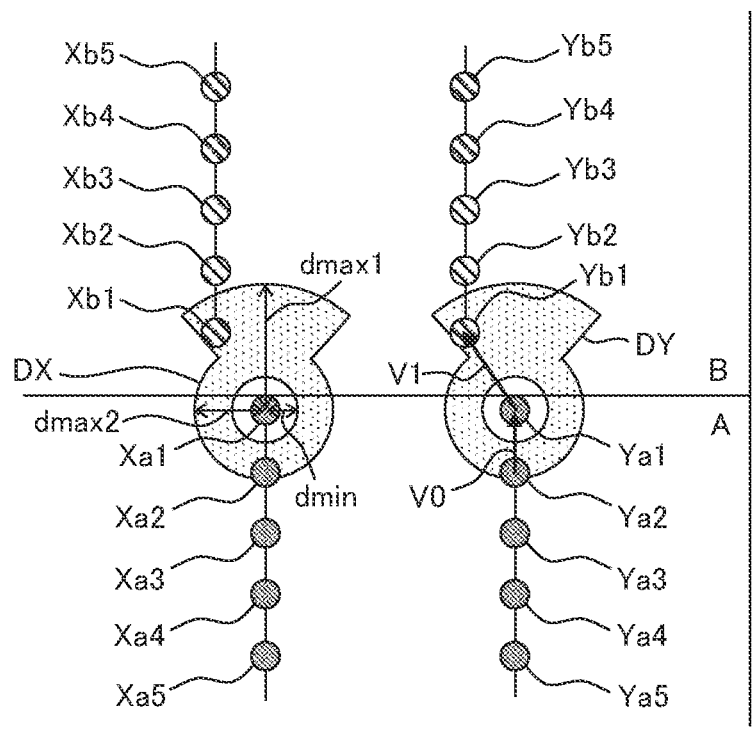
FIG. 7 is a view showing reference ranges.

FIG. 7 is a view showing reference ranges. The reference range DX shows the reference range with respect to the position shown by the point data Xa1. Therefore, the position revising part 412 judges whether to revise the point data showing the dividing line shown by the point data Xa1 and Xb1 by whether the position shown by the point data Xb1 is inside the reference range DX. Further, the reference range DY shows the reference range with respect to the position shown by the point data Ya1. Therefore, the position revising part 412 judges whether to revise the point data showing the dividing line shown by the point data Ya1 and Yb1 by whether the position shown by the point data Yb1 is inside the reference range DY.

As will be understood from the reference ranges DX and DY of FIG. 7, the reference ranges are ranges of greater than or equal to a predetermined minimum distance dmin. The reference distance dmin is, for example, a distance where no unnatural break or deviation occurs in the dividing line icons 52 if the positions shown by the point data of end parts of the boundary side are separated by less than or equal to the same. By making the reference ranges greater than or equal to the minimum reference distance, it is possible to reduce the processing load at the processor 23.

Further, the reference ranges are ranges of less than or equal to the maximum reference distance dmax, which is greater than or equal to the minimum reference distance dmin. In particular, in the present embodiment, as will be understood from FIG. 7, the maximum reference distance dmax is the first maximum reference distance dmax1 in a region of the dividing line shown by the point sequence data near a boundary in the direction of extension toward the boundary and with less than or equal to a predetermined angle with respect to that direction of extension (less than 90 degrees), and the second maximum reference distance dmax2 in a region with greater than or equal to the predetermined angle with respect to that direction of extension (region including direction perpendicular to that direction of extension). The first maximum reference distance dmax1 is longer than the second maximum reference distance dmax2.

Here, when the relative distance is large, there is a possibility that deviation will not occur between positions shown by point data of the end parts due to error between different sections of the map data, but deviation or breaks will occur in the actual dividing lines. In the present embodiment, when the relative distance is larger than the above-mentioned maximum reference distance dmax, the point sequence data is not revised, therefore in cases where deviation or breaks occur in actual dividing lines as well, the point sequence data is kept from being mistakenly revised.

Further, if the dividing lines are shown by the point sequence data, the positions shown by the adjoining point data are separated in the directions of extension of the dividing lines. For this reason, between different sections of the map data, deviation easily occurs in the directions of extension of the dividing lines in the positions shown by the point data of the end parts. In the present embodiment, by the first maximum reference distance dmax1 in the directions of extension of the dividing lines being longer than the second maximum reference distance dmax2, it is possible to suitably revise deviation in the directions of extension of the dividing lines.

If it is judged that the relative distance between positions shown by the point data of the end parts is within a reference range, the position revising part 412 revises the point data showing the position near the boundary of at least one of the dividing line in the section A and the dividing line in the section B so that the dividing line in the section A (first dividing line) expressed by the point sequence data and the dividing line in the section B (second dividing line) are smoothly connected at the boundary.

Figure 8:
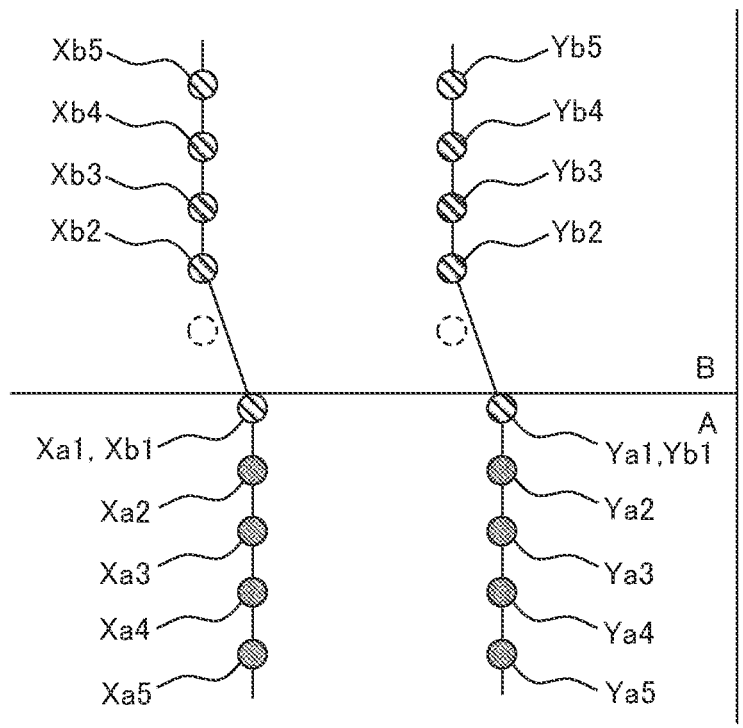
FIG. 8 is a view showing the state of revision of point data showing positions of dividing lines.
Figure 9:
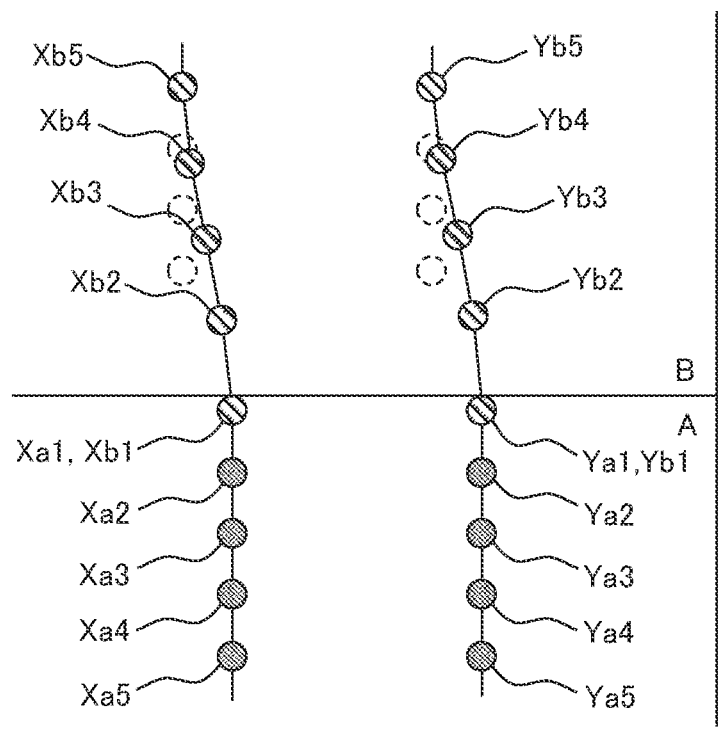
FIG. 9 is a view showing the state of revision of point data showing positions of dividing lines.

FIGS. 8 and 9 are views showing the state of revision of point data expressing the positions of the dividing lines. In the examples shown in FIGS. 8 and 9, in the point data showing the positions of the dividing lines X and Y only in the section B, the five point data Xb1 to Xb5 and Yb1 to Yb5 showing the positions near the boundary (for example, point data positioned within 5 to 10 m from the boundary) are revised. Note that, in revising the point data showing the positions of the dividing lines, it is also possible to revise the point data showing the positions of the dividing lines X and Y only inside the section A (for example, the point data Xa1 to Xa5 and Ya1 to Ya5), or to revise the point data showing the positions of the dividing lines X and Y in both of the section A and the section B (for example, the point data Xb1 to Xb3, Yb1 to Yb3, Xa1 to Xa3, and Ya1 to Ya3).

In revising the point data, the position revising part 412 first, as shown in FIG. 8, revises the point data Xb1 and Yb1 so as to make the positions shown by the point data Xb1 and Yb1 of the end parts in the point sequence data at the boundary side showing the positions of the dividing lines X and Y in the section B move so as to be superposed over the positions shown by the point data Xa1 and Ya1 of the end parts in the point sequence data at the boundary side showing the positions of the dividing lines X and Y in the section A.

Next, the position revising part 412, as shown in FIG. 9, revises the remaining point data Xb2 to Xb5 and Yb2 to Yb5 showing positions near the boundary in the point sequence data showing positions of the dividing lines X and Y in the section B so that the dividing lines shown by these points become smooth. In the present embodiment, the position revising part 412 utilizes a Hermitian curve to revise the remaining point data. Therefore, the curve shown by the point data Xb1 to Xb5 is made a curve which, at the position shown by the point data Xb1, extends in a direction extending from the position shown by the point data Xa2 toward the position shown by the point data Xa1 and, at the position shown by the point data Xb5, extends in a direction extending from the position shown by the point data Xa4 before revision toward the position shown by the point data Xa5 before revision. Similarly, the curve shown by the point data Yb1 to Yb5 is made a curve which, at the position shown by the point data Yb1, extends in a direction extending from the position shown by the point data Ya2 toward the position shown by the point data Ya1 and, at the position shown by the point data Yb5, extends in a direction extending from the position shown by the point data Ya4 before revision toward the position shown by the point data Ya5 before revision. Note that, the position revising part 412 can use any revision technique to revise the point data so that the dividing line becomes smooth.

FIG. 10 is a flow chart showing a flow of position revision processing performed by the position revising part 412. The illustrated processing is performed each time a boundary between sections of map data is included in a road scheduled to be run on up to a predetermined distance forward.

The position revising part 412, first, identifies the point data Xa1 and Ya1 showing the end points of certain dividing lines in the section A and point data Xb1 and Yb1 showing the start points of dividing lines in the section B corresponding to the dividing lines (step S11). Next, the position revising part 412 calculates the relative distances Δd between the positions shown by the point data Xa1 and Ya1 showing the end points and the point data Xb1 and Yb1 showing the start points (step S12). Then, the position revising part 412 judges if the relative distances Δd are greater than or equal to the minimum reference distance dmin (step S13). If at step S13 it is judged that the relative distances Δd are less than the minimum reference distance dmin, the position revising part 412 does not revise any of the point data in the two sections (step S14).

If at step S13 it is judged that the relative distances Δd are greater than or equal to the minimum reference distance dmin, the position revising part 412 calculates the inner products Dt of the vectors V0 and the vectors V1 (step S15). Here, the vectors V0 are vectors from the positions shown by the point data Xa2 and Ya2 showing points one point before the end points of certain dividing lines in the section A to the positions shown by the data Xa1 and Ya1 showing the end points of certain dividing lines in the section A (see FIG. 7). Further, the vectors V1 are vectors from the positions shown by the point data Xa1 and Ya1 showing the end points of certain dividing lines in the section A to the positions shown by the data Xb1 and Yb1 showing the start points of the corresponding dividing lines in the section B (see FIG. 7).

Next, the position revising part 412 judges if the relative distances Δd are less than or equal to the first maximum reference distance dmax1 and the inner products Dt are larger than the reference value Dtref and if the relative distances Δd are less than or equal to the second maximum reference distance dmax2 and the inner products Dt are less than or equal to the reference value Dtref (step S16). If at step S16 any of the conditions is not satisfied, the position revising part 412 does not revise any point data in the two sections (step S14).

On the other hand, if at step S16 any of the conditions are satisfied, the position revising part 412, as shown in FIG. 8, revises the data Xb1 and Yb1 so that the positions shown by the point data Xb1 and Yb1 showing the start points of the dividing lines in the section B overlap the positions shown by the point data Xa1 and Ya1 showing the end points of the same dividing lines in the section A (step S17).

Next, the position revising part 412, as shown in FIG. 9, revises the point data Xb2 to Xb5 and Yb2 to Yb5 showing positions within a predetermined distance from the start points of the dividing lines in the section B to make them move so that the dividing lines shown by these points become smooth (step S18).

The position revising part 412 outputs point sequence data including such revised point data and showing positions of the dividing lines in the section A and the positions of the dividing lines in the section B, to the position data output part 413.

When directly receiving point sequence data from the data acquiring part 411, that is, when acquiring point sequence data showing the position of a dividing line of the road scheduled to be run on up to a predetermined distance forward from only one section of map data, the position data output part 413 outputs as is the point sequence data showing the position of the dividing line in that section acquired by the data acquiring part 411, as data showing the position of the dividing line to the display part 43. On the other hand, when receiving the point sequence data from the position revising part 412, the position data output part 413 outputs point sequence data showing the positions of the dividing line other than near the boundary of the section A and the section B acquired by the data acquiring part 411 and the point data showing the position of the dividing line near the boundary of the section A and the section B revised by the position revising part, as the point sequence data showing the position of the dividing line. The display part 43, as explained above, generates display signals to the display 15 based on the point sequence data showing the position of the dividing line output in this way.

Above, preferred embodiments according to the present invention will be explained, but the present invention is not limited to these embodiments. Various revisions and changes can be made within the language of the claims.

The invention claimed is:

1. A data revision device for revising data showing a position of a dividing line included in map data stored divided into sections, comprising a processor, the processor is configured to:

acquire map data including point sequence data showing a position of a first dividing line in a first section and point sequence data showing a position of a second dividing line corresponding to the first dividing line in a second section adjoining the first section;

revise point data of three points nearest a boundary of at least one of the first dividing line and the second dividing line so that when a relative distance between a position shown by point data of an end point at a boundary side of the first section and the second section in the point sequence data showing the position of the first dividing line and a position shown by point data of an end point at the boundary side in the point sequence data showing the position of the second dividing line is greater than or equal to a predetermined minimum reference distance, the first dividing line and the second dividing line expressed by the point sequence data are smoothly connected at the boundary; and output point sequence data showing positions of the first dividing line and the second dividing line other than three points nearest the boundary and point data showing the revised positions of the first dividing line and the second dividing line at the three points nearest the boundary, as data showing positions of a dividing line including the first dividing line and the second dividing line.

2. The data revision device according to claim 1, wherein the processor is configured not to revise the point data showing the positions of the dividing line when the relative distance is larger than a maximum reference distance of greater than or equal to the minimum reference distance.

3. The data revision device according to claim 2, wherein the maximum reference distance includes a first distance in a direction of extension of the first dividing line or the second dividing line shown by point sequence data of the three points nearest the boundary toward the boundary and a second distance in a direction perpendicular to that direction of extension, the first distance being longer than the second distance.

4. The data revision device according to claim 1, wherein the processor is configured to make a position shown by point data positioned at an end part at the boundary side in the point sequence data showing a position of the second dividing line move so as to be superposed over a position shown by point data positioned at an end part at the boundary side in the point sequence data showing a position of the first dividing line, and revise the remaining two data points in each line showing positions of the second dividing line nearest the boundary so that the dividing line shown by these point data become smooth.

5. A vehicle comprising:
a data revision device for revising data showing a position of a dividing line included in map data stored divided into sections, comprising a processor;
a display arranged so that an occupant can view it; and
the processor is configured to display an image including a dividing line icon on the display, wherein
the display displays the dividing line icon based on data output by the data revision device; wherein the processor is further configured to:
acquire map data including point sequence data showing a position of a first dividing line in a first section and point sequence data showing a position of a second dividing line corresponding to the first dividing line in a second section adjoining the first section;
revise point data of three points nearest a boundary of at least one of the first dividing line and the second dividing line so that when a relative distance between a position shown by point data of an end point at a boundary side of the first section and the second section in the point sequence data showing the position of the first dividing line and a position shown by point data of an end point at the boundary side in the point sequence data showing the position of the second dividing line is greater than or equal to a predetermined minimum reference distance, the first dividing line and the second dividing line expressed by the point sequence data are smoothly connected at the boundary; and
output point sequence data showing positions of the first dividing line and the second dividing line other than three points nearest the boundary and point data showing the revised positions of the first dividing line and the second dividing line at the three points nearest the boundary, as data showing positions of a dividing line including the first dividing line and the second dividing line.

6. The vehicle according to claim 5, wherein the processor is configured to control automated driving of the vehicle by using the map data, and
the processor is configured to control automated driving of the vehicle by using data showing positions of the dividing line not revised by the data revision device.

7. A data revision method for revising data showing a position of a dividing line included in map data stored divided into sections, the data revision method comprising:
acquiring map data including point sequence data showing a position of a first dividing line in a first section and point sequence data showing a position of a second dividing line corresponding to the first dividing line in a second section adjoining the first section;
revising point data of three points nearest a boundary of at least one of the first dividing line and the second dividing line so that when a relative distance between a position shown by point data of an end point at a boundary side of the first section and the second section in the point sequence data showing the position of the first dividing line and a position shown by point data of an end point at the boundary side in the point sequence data showing the position of the second dividing line is greater than or equal to a predetermined minimum reference distance, the first dividing line and the second dividing line expressed by the point sequence data are smoothly connected at the boundary; and
outputting point sequence data showing positions of the first dividing line and the second dividing line other than the three points nearest the boundary and point data showing the revised positions of the first dividing line and the second dividing line at the three points nearest the boundary, as data showing positions of a dividing line including the first dividing line and the second dividing line.

8. A non-transitory computer readable medium having recorded thereon a data revision program for revising data showing a position of a dividing line included in map data stored divided into sections, the data revision program causing a computer to execute a process comprising:
acquiring map data including point sequence data showing a position of a first dividing line in a first section and point sequence data showing a position of a second dividing line corresponding to the first dividing line in a second section adjoining the first section;
revising point data of three points nearest a boundary of at least one of the first dividing line and the second dividing line so that when a relative distance between a position shown by point data of an end point at a boundary side of the first section and the second section in the point sequence data showing the position of the first dividing line and a position shown by point data of an end point at the boundary side in the point sequence data showing the position of the second dividing line is greater than or equal to a predetermined minimum reference distance, the first dividing line and the second dividing line expressed by the point sequence data are smoothly connected at the boundary; and
outputting point sequence data showing positions of the first dividing line and the second dividing line other than the three points nearest the boundary and point data showing the revised positions of the first dividing line and the second dividing line at the three points nearest the boundary, as data showing positions of a dividing line including the first dividing line and the second dividing line.

* * * * *